Feb. 8, 1927.
L. MELANOWSKI
1,617,265
POWER TRANSMITTING MECHANISM
Filed July 24, 1919    5 Sheets-Sheet 1
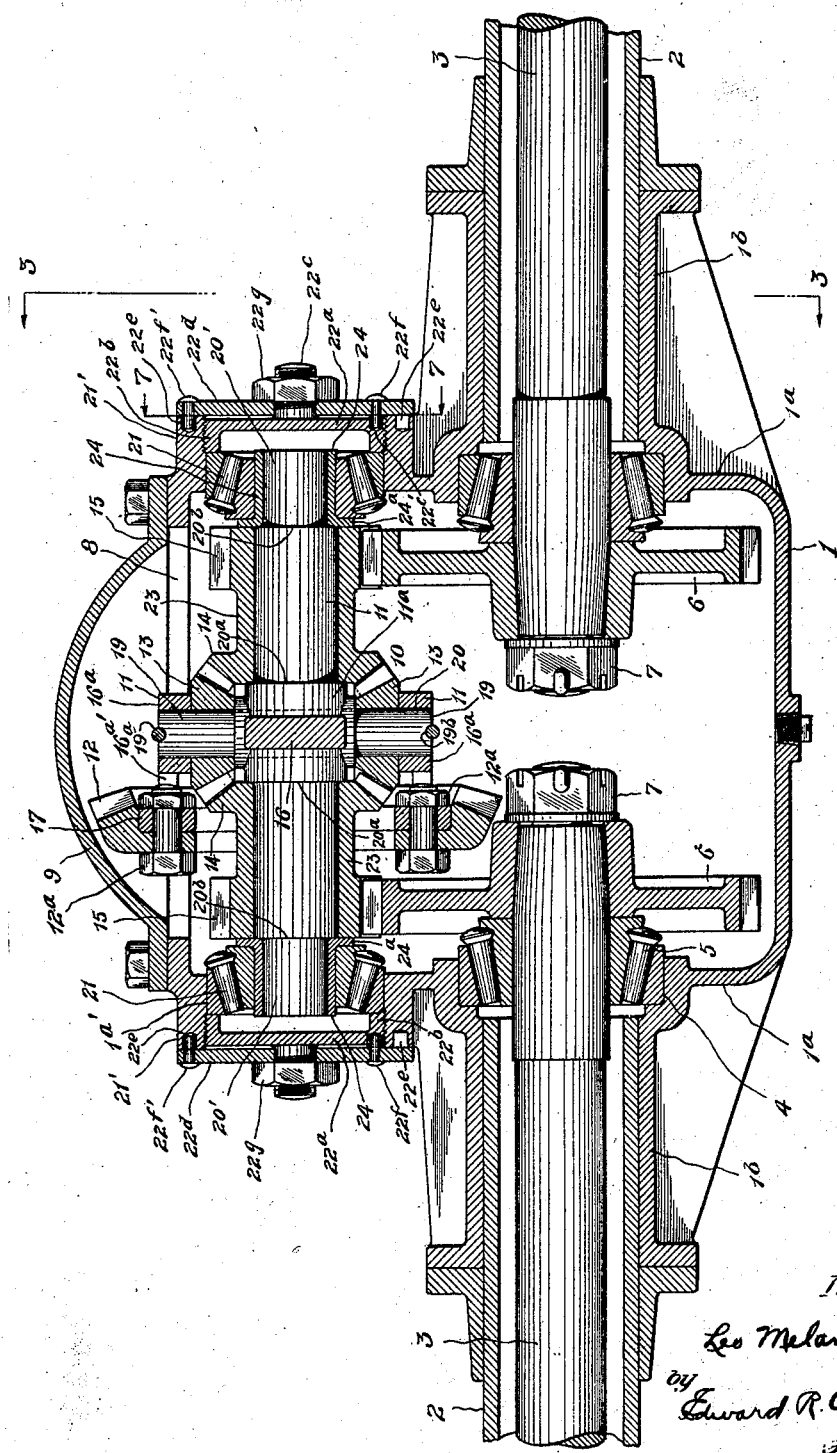
Inventor
Leo Melanowski
by Edward R. Alexander
Attorney

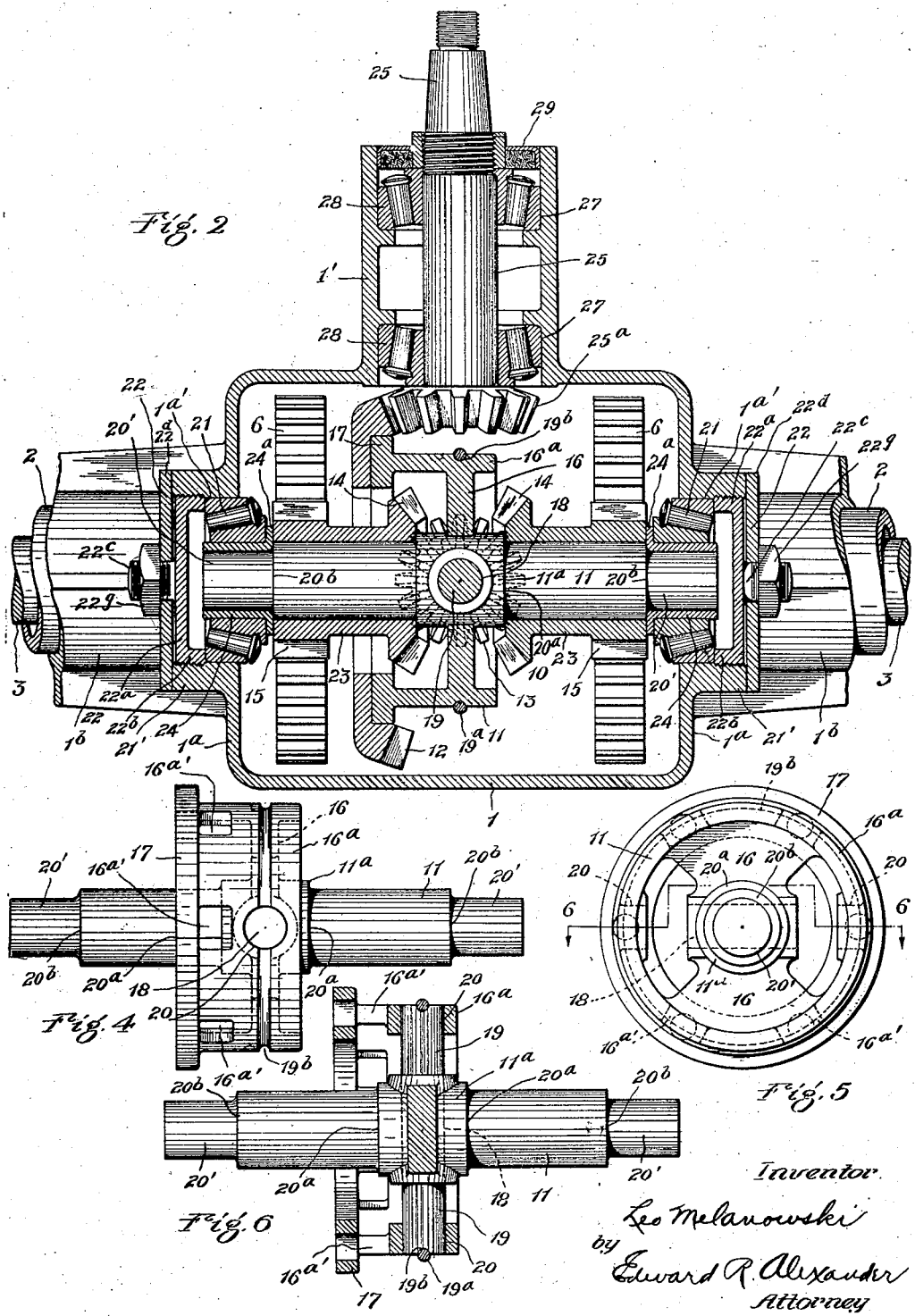

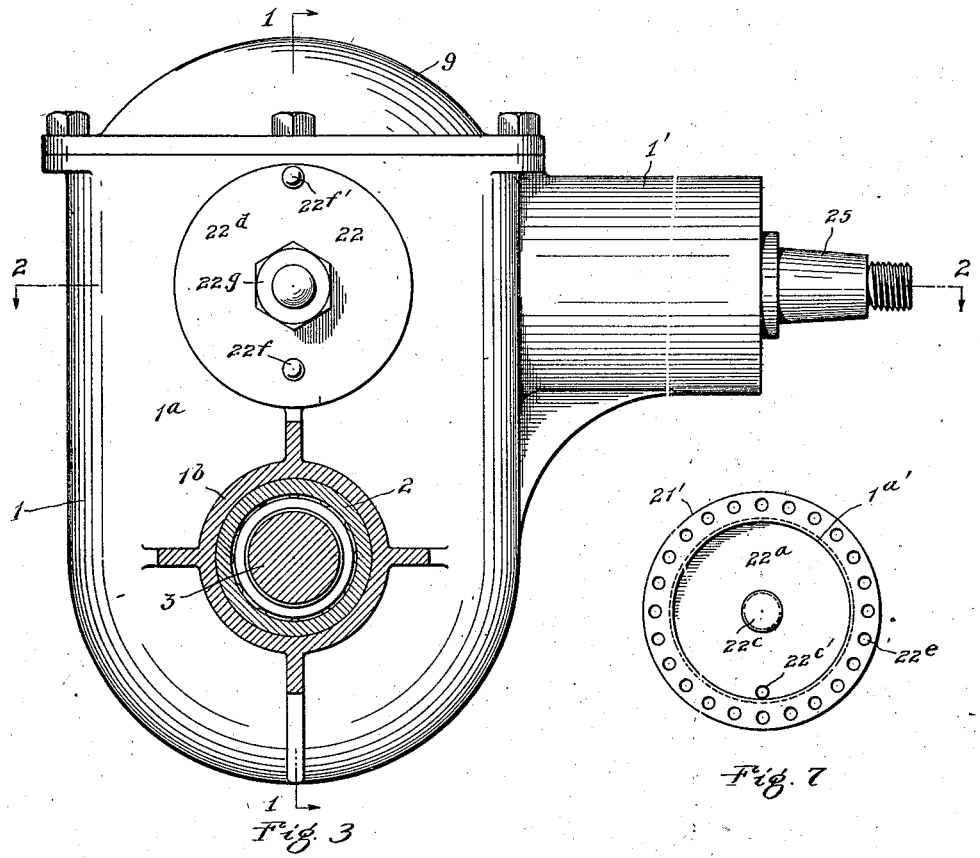
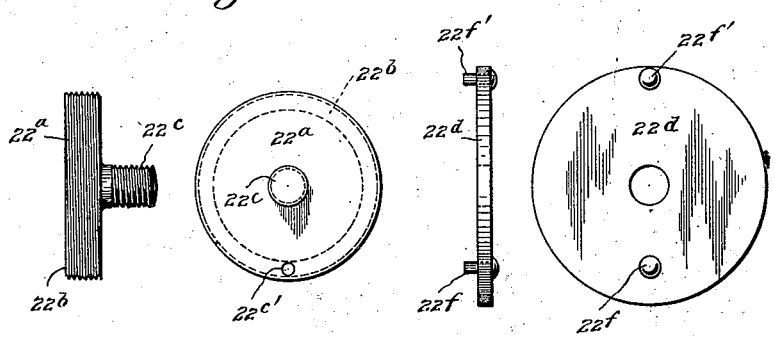

Feb. 8, 1927. 1,617,265
L. MELANOWSKI
POWER TRANSMITTING MECHANISM
Filed July 24, 1919     5 Sheets-Sheet 4
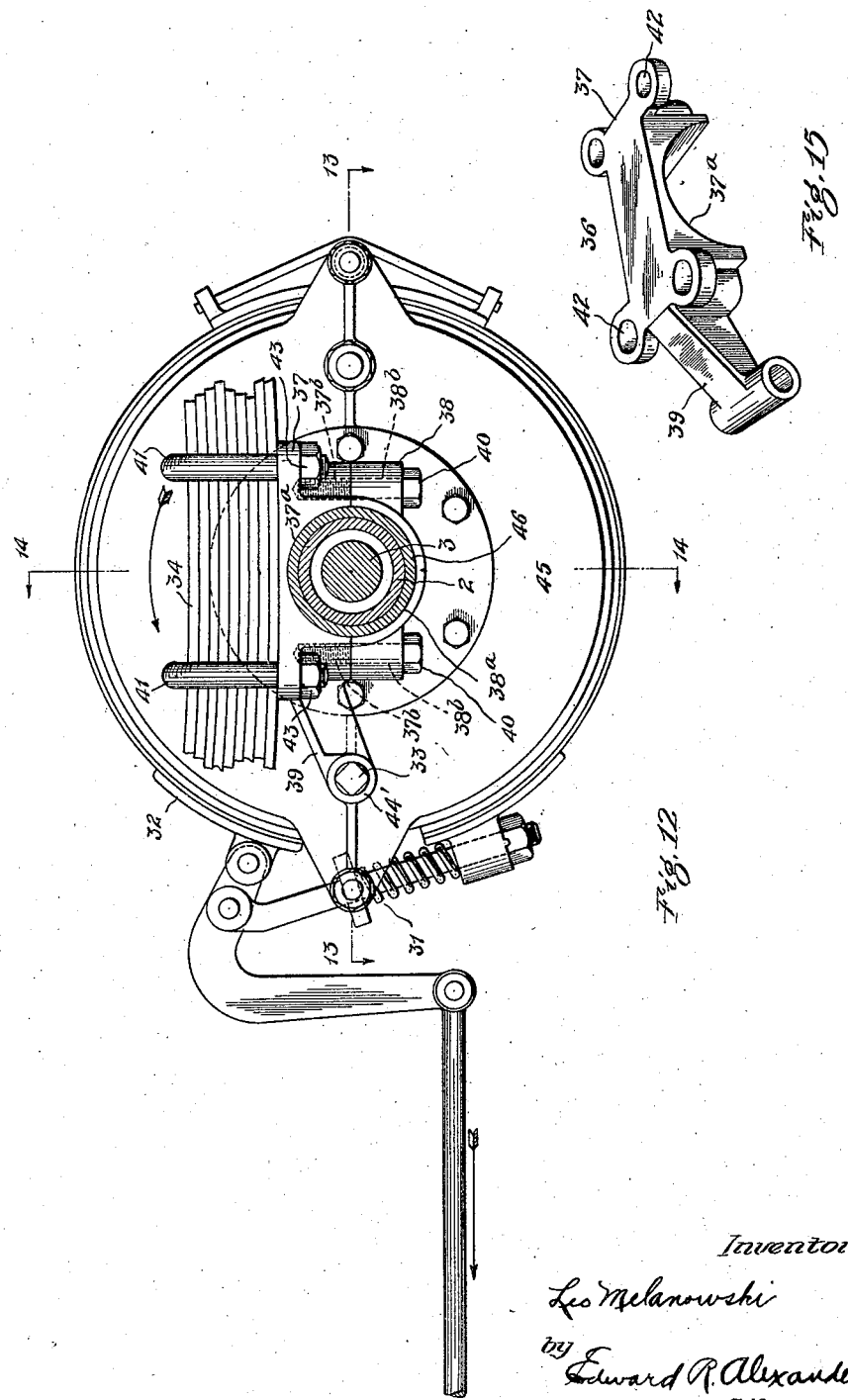

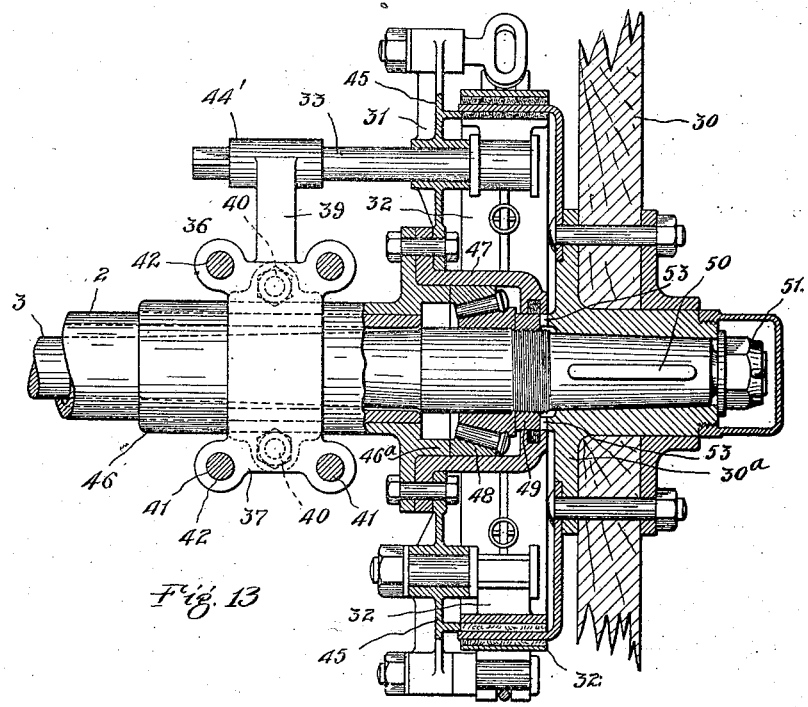

Patented Feb. 8, 1927.

1,617,265

UNITED STATES PATENT OFFICE.

LEO MELANOWSKI, OF CLEVELAND, OHIO, ASSIGNOR TO THE UNION TRUST COMPANY, OF CLEVELAND, OHIO, A CORPORATION OF OHIO.

POWER-TRANSMITTING MECHANISM.

Application filed July 24, 1919. Serial No. 313,002.

This invention relates to power transmitting mechanisms for motor vehicles.

One object of the invention is to provide a relatively simple mechanism of this character capable of insuring proper speed reductions in driving either relatively heavy or light vehicles.

Another object of the invention is to provide an improved power transmitting mechanism the elements of which are strong, durable, compactly arranged and lend themselves to easy manufacture, assembly, disassembly and adjustment.

Another object of the invention is to provide an improved and relatively simple driving mechanism in which friction losses and strains and stresses upon the driving elements and supports therefor are minimized.

Another object of the invention is to provide improved supporting means for the brake operating rod or rods, whereby the construction is simplified, disalignment prevented and cost of manufacture reduced.

Other objects of the invention will be apparent to those skilled in the art to which my invention relates from the following description taken in connection with the accompanying drawings.

For the purpose of illustration, I have in the accompanying drawings shown and herein described one form of mechanism embodying my invention.

In the drawings,

Fig. 1 is a vertical section of a power transmitting mechanism embodying my invention, taken on the line 1—1 of Fig. 3.

Fig. 2 is a horizontal section on the line 2—2 of Fig. 3.

Fig. 3 is a section on the line 3—3 of Fig. 1.

Fig. 4 is a detail view of the rotatable member.

Fig. 5 is an end view of the rotatable member.

Fig. 6 is a section on the line 6—6 of Fig. 5.

Fig. 7 is a detail view looking at one of the bearings.

Figs. 8, 9, 10 and 11 are detail views of the bearing, adjusting and locking elements.

Fig. 12 is a transverse sectional view through one of the tubular members showing the spring and brake rod supporting means.

Fig. 13 is a section on the line 13—13 of Fig. 12.

Fig. 14 is a section on the line 14—14 of Fig. 12.

Fig. 15 is a detail view of a spring seat and brake rod bearing bracket.

In the drawings, 1 indicates a housing formed in any desired manner, but of a size and shape to enclose the mechanism hereinafter described. From its opposite sides extend tubular members 2, each enclosing a driven shaft or axle section 3. I have embodied my invention in what is known as a live axle type of construction for illustrative purposes; notwithstanding these illustrations, which show the preferred embodiment of my invention, it will be understood that my invention may be applied to or in other forms or types of axle construction. The side walls $1^a$ of the housing 1 are provided with tubular extensions $1^b$, which receive and support the inner ends of the tubular members 2. The extensions $1^b$ may be formed integrally with the side walls $1^a$ of the housing. At 4, the walls $1^a$ are formed with annular recesses, which surround the inner ends of the extensions, and receive the outer race of an anti-friction bearing 5, preferably of the tapered roller type. Above and preferably in the vertical plane cutting the axes of the extensions $1^b$, the side walls $1^a$ are formed with openings $1^{a'}$ the inner walls of which are provided with screw threads for a purpose to be later set forth.

6 indicates a pair of spur gears, each mounted on the inner end of one of the axle sections 3. Each gear is fixed to the adjacent axle section in any well known manner, but it preferably abuts against the inner race of the bearing 5 and may be held in such position by a nut 7.

9 indicates a cover for the opening 8 preferably formed in the top of the housing 1. The opening 8 is large enough to permit assembly, disassembly and adjustment of the power transmitting elements, including a differential mechanism, indicated as an entirety at 10.

Of the differential mechanism 10, 11 indicates a shaft and housing element rotatably mounted at its opposite ends and adapted to form the support for the (1) main or ring gear 12, (2) differential pinions 13, (3) differential gears 14 and (4) speed reducing pinions 15, which mesh with and drive the gears 6. To permit adjustment of the shaft and housing element 11, in the manner hereinafter to be set forth, and maintain at all times operative engagement of the pinions 15 with the gears 6, the former are preferably made somewhat wider than said gears 6, as shown in Figs. 1 and 2. As shown, the element 11 is provided substantially midway between its opposite ends with a body portion $11^a$ from which extend radially, in opposite directions, webs 16. $16^a$ indicates a ring surrounding the body portion and supported concentrically to its axis by the webs 16. At one side the ring $16^a$ is flanged, as shown at 17, to form a supporting surface to which the main gear 12 is secured, preferably by suitable bolts and nuts $12^a$. The ring $16^a$ is formed with a plurality of openings $16^{a'}$ in which the nuts $12^a$ are received, as shown in Fig. 1. As a result of this construction, the flange 17 can extend equal distances to either side of the ring $16^a$, as shown, thus (1) reducing the outside diameter of the flange and (2) permitting the use of a relatively small sized ring gear 12, which insures strength and economy in production.

18 indicates an opening formed in and preferably extending through the body portion $11^a$ in a direction which intersects the axis of the element 11, but preferably at right angles to the webs 16. The opening 18 receives and supports a shaft or shafts 19 on which are loosely mounted the differential pinions 13. The opposite ends of the shaft 19 are preferably mounted in openings 20 formed in the ring $16^a$ (see Figs. 1, 4, 5 and 6). The opposite sides of the body portion $11^a$ and adjacent inner surface of the ring $16^a$ are preferably provided with flat bearing surfaces which are properly spaced to receive the pinions 13 between them and prevent movement thereof endwise of the shaft 19 (see Figs. 5 and 6). The shaft 19 is preferably made in one piece fixed in one or more of the openings 18, 20, in any desired manner. In the form of construction shown, I provide a resilient ring $19^a$ which surrounds the ring $16^a$ and extends across the opposite ends of the shaft 19, (preferably intersecting the longitudinal axis of the shaft), thus preventing it from moving endwise in either direction. To maintain the ring $19^a$ in proper operative position at all times, I prefer to form in the ring $16^a$ an annular groove $19^b$ in which the resilient ring fits. The opposite ends of the resilient ring $19^a$ are disconnected from each other to permit its ready assembly and removal. By removing the resilient ring $19^a$, the shaft 19 and pinions 13 can be disassembled. $20'$, $20'$, indicate shaft members extending laterally from the opposite ends of the body portion $11^a$ and mounted at their free ends in bearings 21, 21, each mounted in one of the openings $1^{a'}$. The side walls $1^a$ of the casing or housing are provided with collars $21'$ surrounding the openings $1^{a'}$ to afford ample supporting surfaces not only for the bearings 21 but also for suitable adjusting means (indicated as an entirety at 22) therefor. The bearings 21 are preferably of the tapered roller type and arranged to take thrusts endwise of the element 11 in either direction. The body portion $11^a$, webs 16, ring $16^a$, flange 17 and shaft members $20'$ are preferably formed integral, as shown in Figs. 4, 5 and 6.

23 indicates a sleeve rotatively mounted on each shaft member $20'$ and preferably formed integral with the adjacent gear 14 and pinion 15 to provide a unitary gear element between the adjacent differential pinion 13 and driven gear 6. This form of construction is relatively simple and insures durability and strength as well as maximum efficiency in the transmission of power to the gears 6. The body portion $11^a$ may be made somewhat larger than the shaft members $20'$ to form shoulders $20^a$ against which the inner ends of the sleeves 23 or inner faces of the pinions 14 abut. To prevent movement of the sleeves 23 endwise of the shaft members $20'$ outwardly, the free ends of these members are reduced to form shoulders $20^b$ and bushings 24 are fitted thereon and against the shoulders $20^b$. The bushings 24 are each provided with a flange $24^a$ which extends beyond the adjacent shoulder or outer surface of the shaft member $20'$ and serves as an abutment for the outer end of the adjacent sleeve 23. This form of construction at the outer end of each shaft member $20'$ also provides a seat for the inner race of the adjacent bearing 21. As shown in the drawings, the bushings 24 fit against the shoulders $20^b$ and the bearings 21 co-act with these shoulders to support the shaft and housing element 11; accordingly, whenever adjustment of the bearings 21, either or both, is found necessary, such adjustment acts, through the bushings 24, against the shoulders $20^b$ and does not affect the gear elements mounted on the shaft members $20'$. As the bushings 24 engage the shoulders $20^b$, it will be seen that adjustment of the bearings 21 cannot move the bushings endwise of the shaft members $20'$, and therefore the distance between the shoulders $20^a$ and flanges $24^b$ will always remain the same and insure free rotation of the gear elements at all times.

25 indicates a propeller pinion shaft the forward end of which is adapted to be connected in any well known way to a driving element, such for example as the propeller shaft (not shown) of the vehicle. The rear end of the pinion shaft 25 is provided with a pinion $25^a$, which meshes with and drives the gear 12. The shaft 25 extends through a tubular member 1', the inner walls of which are provided with suitable seats 27 to receive the outer races of bearings 28. The bearings 28 may be of the tapered roller type and arranged to take thrusts endwise of the shaft 25 in both directions. The outer end of the tubular member 1' is preferably closed by an annular cap 29 to keep out dust and other foreign matters.

Of the adjusting means 22 at each end of the element 11, 22$^a$ indicates an adjusting element fitting within each opening 1$^{a\prime}$ and having screw threaded connection with the inner walls of the opening 1$^{a\prime}$ or the collar surrounding it. The inner face of the adjusting element 22$^a$ is hollowed out to form an annular flange 22$^b$, which engages with the outer race of the adjacent bearing 21 to position it. By turning the element 22$^a$ in the proper direction, the outer race of the bearing 21 may be adjusted to the proper position. 22$^c$ indicates a projecting member extending outwardly from the outer face of the adjusting element 22$^a$. 22$^d$ indicates a lock member formed with an opening into and through which the projecting member 22$^c$ extends. 22$^{c\prime}$ indicates an opening formed in the adjusting element 22$^a$. 22$^e$ indicates a series of openings formed in the outer end of the collar surrounding the opening 1$^{a\prime}$. 22$^f$, 22$^{f\prime}$ indicates a pair of pins extending inwardly from the inner face of the locking member 22$^d$. One pin, 22$^f$, is adapted to extend into the opening 22$^{c\prime}$ formed in the element 22$^a$, and the other pin 22$^{f\prime}$ is adapted to extend into one of the openings 22$^e$. When the locking member 22$^d$ is positioned on the projecting member, 22$^c$, with the pins fitting into the openings 22$^{c\prime}$, 22$^e$, as just described, the adjusting element 22$^a$ will be locked against turning. By forming the end wall of the adjacent collar with a plurality of openings 22$^e$, it will be understood that provision is made for locking the element 22$^a$ in any one of many positions of adjustment. The projecting member 22$^c$ may serve as an axle about which the locking member 22$^d$ may be rotated to position its pins in registering position with the openings 22$^{c\prime}$ and 22$^e$ after the element 22$^a$ has been adjusted. I prefer to provide means for holding the locking member in its operative position. For this purpose I provide the projecting member 22$^c$ with screw threads and mount thereon a nut 22$^g$ which, when screwed up, will clamp the locking member in position against the end wall of the collar.

The adjusting devices 22 for the supporting bearings 21 at the opposite ends of the supporting element 11 may be properly adjusted to prevent all endwise movement thereof and at the same time position the gear 12 in proper operative relation to the pinion 26. In assembling these elements, I prefer to adjust the bearing 21 at the left side of Fig. 1 to correlate the gear 12 with the pinion 26, and thereafter adjust the opposite bearing 21 to rotatably support the element 11.

30 indicates a portion of a wheel preferably fixed to the outer end of one of the axle sections 3 (only one wheel being shown). It will be understood that the outer end of the other axle section 3 carries a similar wheel and that associated therewith are mechanisms, a spring and other elements similar to those now to be referred to. 31 indicates a suitable braking mechanism, having braking shoes 32 adapted to be operated by a rock shaft or rod 33 in a well known manner. 34 indicates a leaf spring adapted to be connected to the vehicle frame in any well known manner. 36 indicates as an entirety means for supporting and connecting the spring 34 and brake rod 33 to the adjacent tubular extension 2. The supporting and connecting means 36 comprise a pair of upper and lower blocks 37, 38, and a bracket 39 formed integrally with one of them, preferably the upper block 37. The blocks 37 and 38, are provided with semi-circular walls 37$^a$, 38$^a$, which engage with and surround the tubular extension 2. The blocks 37, 38 are formed with suitable openings 37$^b$, 38$^b$, to receive bolts 40. The bolts 40 preferably extend through the openings 38$^b$ and into the openings 37$^b$. When so constructed the latter openings are provided with screw threads (see Fig. 12) with which the threads on the bolts engage. The upper block 37 may be provided with a relatively large upper surface which forms a seat for the spring 34. The spring 34 may be secured in position by one or more U-bolts 41, the opposite ends of which are screw threaded, and extend through suitable openings 42 formed in the block 37. 43 indicates nuts which engage the screw-threaded ends of the U-bolts 41 and through them clamp or secure the spring 34 to the block 37. The bracket 39 is formed at its outer end with an opening through which the brake shoe operating rod 33 extends. By preference, the outer end of the bracket 39 is provided with a tubular member 44' (see Fig. 13) so that a long bearing may be provided for the rod 33.

45 indicates an annular plate arranged on the inner side of the drum of the brake mechanism and adapted to support the free end of the brake rod 33 and the inner ends of the brake shoes in a well known manner. 46 indicates a sleeve surrounding the outer end of the tubular extension 2 and provided with a flange to which the plate 45 is secured. When a sleeve or like element, such as shown at 46 is provided, the walls 37$^a$, 38$^a$, are shaped and sized accordingly. In the present construction the sleeve 46 is advantageous, since it serves to strengthen the tubular extension 2 as well as to resist the strains due to clamping the supporting means 36 to the axle housing members 2 Between the plate 45 and the flange of the sleeve 46 I mount a casing 47 which serves as a support for the outer race of a bearing 48. The outer end of the casing is contracted into engagement with the adjusting nut 49 for the inner race of the bearing 48 so as to enclose the latter and form an oil chamber and to protect the bearing from foreign matters. The sleeve 46 is preferably provided with a collar 46ª which serves as an abutment for the outer bearing race.

The wheel 30 may be secured to the outer end of the axle section 3 by any suitable means, that shown comprising a key or keys 50 and a nut 51. I prefer to provide interlocking elements between the wheel and the bearing adjusting nut 49 so that when the wheel 30 is positioned on and secured to the axle section, it will at the same time lock the nut 49 against turning. For this purpose the outer face of the nut 49 is provided with a plurality of projections or teeth 52, uniformly spaced relative to each other, and the inner end of the wheel hub 30ª is provided with a plurality of uniformly spaced projections or teeth 53 which fit in the spaces between the teeth 52 on the nut 49, when the wheel is positioned on the axle section 3, as shown in Figs. 13 and 14, and lock the nut against turning. Since, in the preferred form of construction I provide a final speed reduction, comprising spur gears, between the differential mechanism 10 and the axle sections 3, no adjustment of the axle sections 3 will be necessary after assembly thereof between the bearings 5 and 48 has once been made. This construction therefore lends itself admirably to the maintaining of these elements in assembled position.

My invention has the advantage of being relatively simple, enabling me to correlate the several elements in a small housing in which they may be readily assembled and adjusted or removed. It will be seen that I provide, as a single unitary integral structure, a rotatable member comprising (1) a ring supporting the differential ring gear and the shafts for the differential planetary pinions 13 and (2) shaft members rotatably supported at their outer ends and serving as axles for both the differential gear and driving pinion at each side of the ring gear. This form of construction is advantageous in that it is capable of withstanding the strains and stresses incident to the driving of the vehicle and also maintain the gear elements in alignment and co-operative relationship with the pinions 13 and gears 6, thus preventing undue friction there-between. It will be noted that for transmitting the power from each differential gear to each axle section 3, I employ only two gears, these by preference being speed reducing, spur gears, the driving pinion of which is integrally connected through a relatively short sleeve with the adjacent differential gear. By providing a single rotatable member with which the support for the ring gear is connected, I am enabled to compactly arrange all of the power transmitting elements into a relatively small housing and rotatably mount them therein in a minimum number of bearings. In this connection it will be noted that but two bearings are required for the rotatable member and these are arranged at the opposite ends thereof, beyond the gear elements and in the side walls of the housing where adjustment can be readily made. Furthermore, since the gear elements 6 and 15 are spur gears and the former are fixed to the axle section 3, I am enabled to provide a power transmitting mechanism in which after its assembly, but one adjustment is required, this being between the propeller shaft pinion 26 and ring gear 12. As already set forth, this adjustment is made through and by means of the bearings 21 which are readily accessible without dismantling the mechanism or even removing the cover 9 for the housing 1.

Since the mechanism embodying my invention is relatively simple and the same may be housed in a comparatively small housing, it will be seen that the unsprung weight of the vehicle will be low as compared to most constructions of which I am aware.

To those skilled in the art of making mechanism of the class described, many alterations in construction and widely differing embodiments and applications of my invention will suggest themselves, without departing from the spirit and scope thereof. My disclosures and description herein are purely illustrative and are not intended to be in any sense limiting.

What I claim is:

1. In apparatus of the class described, the combination of an integrally formed housing having pairs of aligned openings therethrough, the walls of one pair of which are integrally formed, aligned driven axle sections extending into said housing through one pair of openings, anti-friction bearings for the inner ends of said axle sections mounted in bearings supported in the walls of one of said pair of openings, a driven gear on the inner end of each axle section, an element comprising a central body portion, a ring, radial webs and shaft members formed integrally, anti-friction bearings supported in the integrally formed walls of said second pair of aligned openings and supporting the outer ends of said shaft members, a ring gear secured to said ring, pinions carried by said element, driving connections including differential gears between said pinions and said driven gears and driving means for said ring gear.

2. In mechanism of the class described, the combination of a housing having a pair of bearing receiving, aligned openings having integral walls and a larger opening in a plane transverse to the planes of said aligned openings, caps for each of said openings, anti-friction bearings in each of said aligned openings, a power transmitting mechanism comprising a shaft, a ring gear rigidly secured to said shaft, differential gears loosely mounted on said shaft, differential pinions carried by said shaft and meshing with said differential gears and pinions driven by said differential gears and driven gears mounted in said housing and meshing with said last described pinions, said shaft and the gearing mounted on and carried thereby being insertable into and withdrawable from said housing through said larger opening therein and the opposite ends of said shaft being mounted in said anti-friction bearings in operation.

3. In a mechanism of the class described, the combination of a housing having a pair of aligned bearing receiving openings formed with integral walls and a larger opening in a plane transverse to the planes of said aligned openings, anti-friction bearings in each of said aligned openings, removable caps for each of said openings, those for said aligned openings carrying adjustable abutments for the adjacent anti-friction bearing, a power transmitting mechanism comprising a shaft, a ring gear rigidly secured thereto, differential gears loosely mounted thereon, differential pinions meshing with said differential gears and pinions driven by said differential gears, and driven gears mounted in said housing and meshing with said last described pinion, said shaft and the gearing mounted on and carried thereby being insertable into and withdrawable from said housing through said larger opening therein, and the opposite ends of said shaft being mounted in said anti-friction bearings and positioned within said housing by the adjustment of said bearing abutments.

4. In mechanism of the class described, a power transmitting integrally formed element comprising a shaft, radially extending webs arranged substantially midway between the opposite ends of said shaft and a ring supported concentrically to said shaft by said webs, said ring and shaft having openings to receive a shaft for differential pinions and said ring having an annular groove in the plane of said last described shaft and a resilient locking ring in said groove.

5. In mechanism of the class described, the combination of a power transmitting, integrally formed element comprising a shaft, radially extending webs arranged substantially midway between the opposite ends of said shaft and a ring supported concentrically to said shaft by said webs, said ring and shaft being formed with openings and said ring having an annular groove, stud shafts mounted in said openings, differential pinions mounted on said stud shafts, and means mounted in the annular groove formed in said ring for holding the stud shafts in the openings formed therefor.

6. In apparatus of the class described, the combination of aligned rotatable axle sections, each carrying at its rear end a spur gear, a rotatable member mounted parallel to said axle sections, a differential pinion carrier carried by said rotatable member and differential pinions carried thereby, a driving gear for said rotatable member, gear elements, each comprising a differential gear meshing with said differential pinions, a spur pinion meshing with one of said driven spur gears and rotatably mounted on said rotatable member, each of said spur pinions being wider than the spur gear with which it meshes, and means for axially adjusting said rotatable member.

In testimony whereof I affix my signature.

LEO MELANOWSKI.